(No Model.) 2 Sheets—Sheet 1.

C. J. UNDERWOOD.
AIR MOTOR.

No. 561,033. Patented May 26, 1896.

Witnesses
George Carter
P. E. Kilgerwood

Inventor
Chester J. Underwood
By his Attorney
Henry F. Noyes (No Model.) 2 Sheets—Sheet 2.
C. J. UNDERWOOD.
AIR MOTOR.
No. 561,033. Patented May 26, 1896.
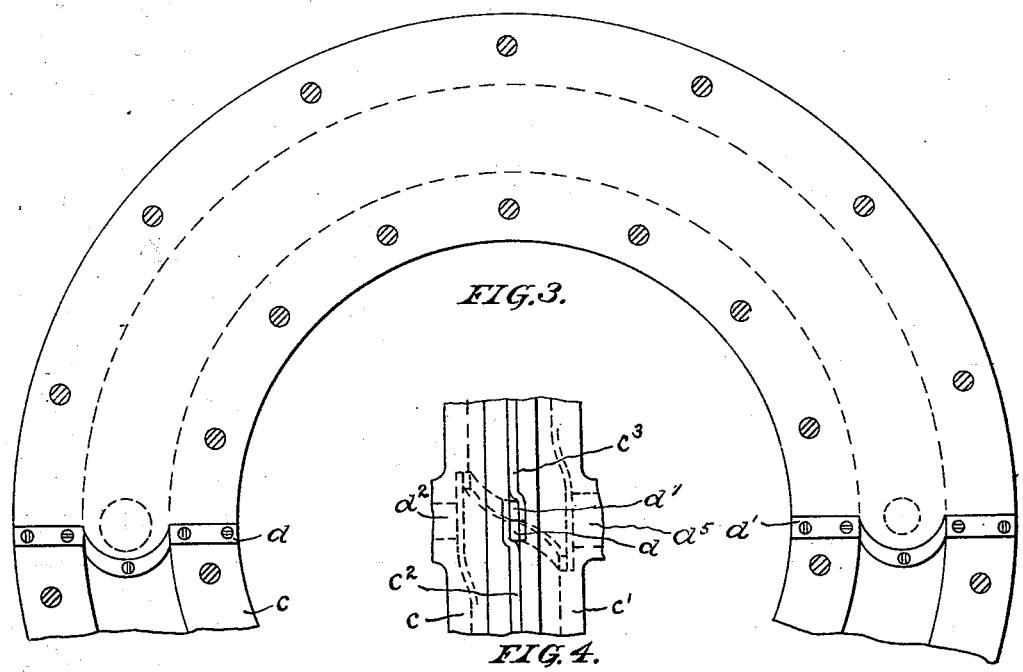
FIG. 3.
FIG. 4.
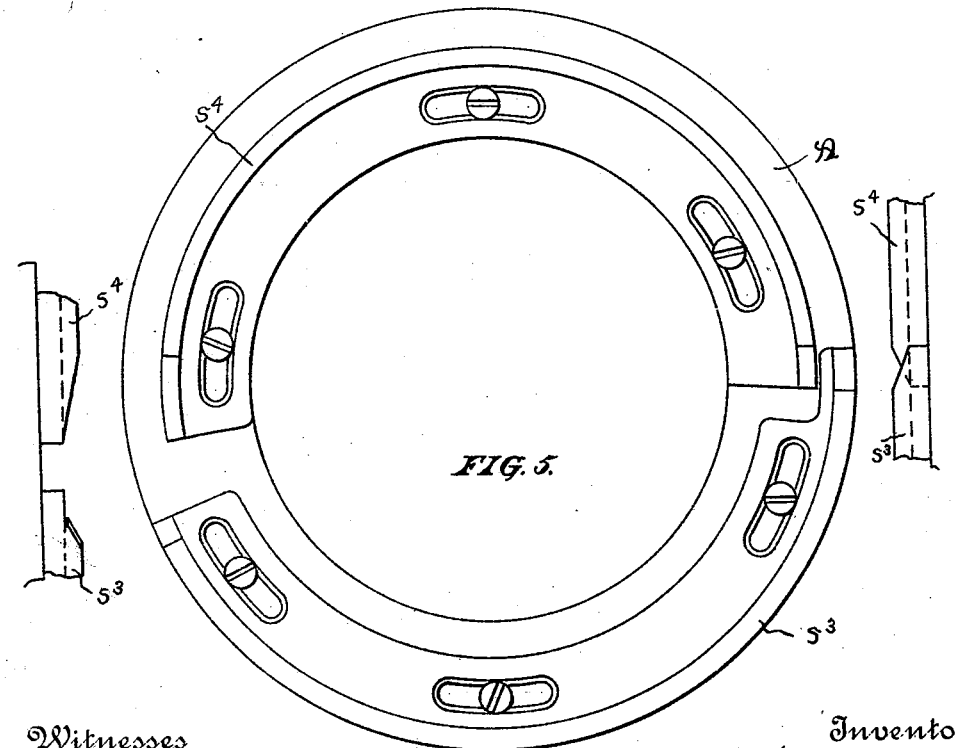
FIG. 5.
Witnesses
Geo. M. Carter
R. E. Lidyurwood
Inventor
Chester J. Underwood
By his Attorney
Henry F. Noyes

UNITED STATES PATENT OFFICE.

CHESTER J. UNDERWOOD, OF ELGIN, ILLINOIS, ASSIGNOR OF ONE-FOURTH TO EDWARD HASKINS, OF ST. CHARLES, ILLINOIS.

AIR-MOTOR.

SPECIFICATION forming part of Letters Patent No. 561,033, dated May 26, 1896.

Application filed August 3, 1895. Serial No. 558,154. (No model.)

*To all whom it may concern:*

Be it known that I, CHESTER J. UNDERWOOD, of Elgin, Kane county, Illinois, have invented a certain new and useful Air-Motor, of which the following is a specification.

This invention relates to motors in which air is the actuating medium, and in particular where the air is assisted in its action by a column of mercury, thus disclosing an idea entirely novel in this or any class of motors.

The object of this invention is to provide a cheap, simple, and efficient motor, one that will require little care to operate, and that will be especially adapted for certain operations requiring only a small amount of power and where the space is limited, as for sewing-machines, dentistry, &c.

This invention consists, substantially, in the construction, combination, arrangement, and relative location of parts as shown in the accompanying drawings, as will be more fully described in the specification, and more particularly pointed out in the claims.

Figure 2:
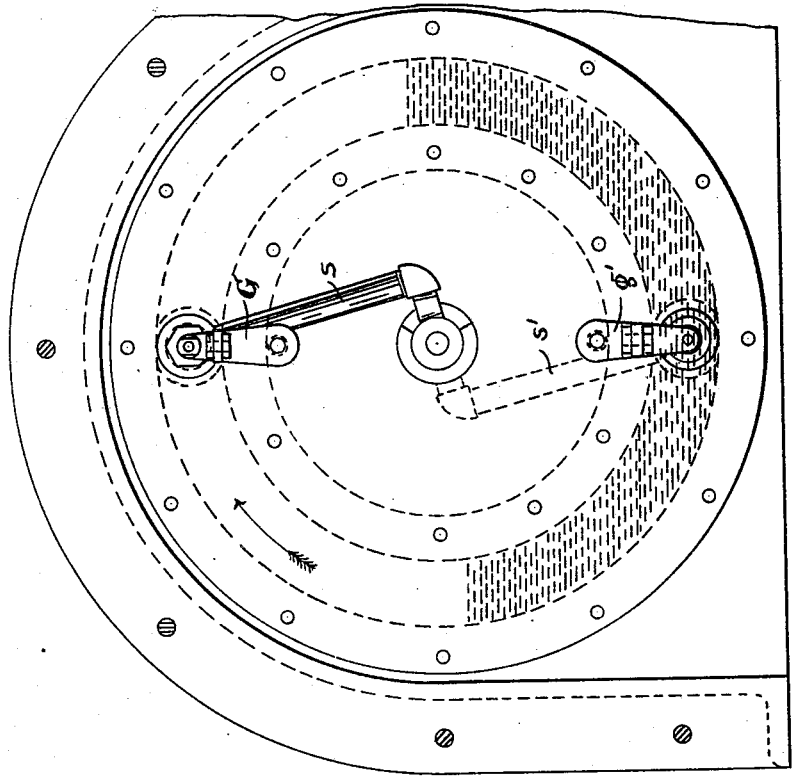
Figure 1:
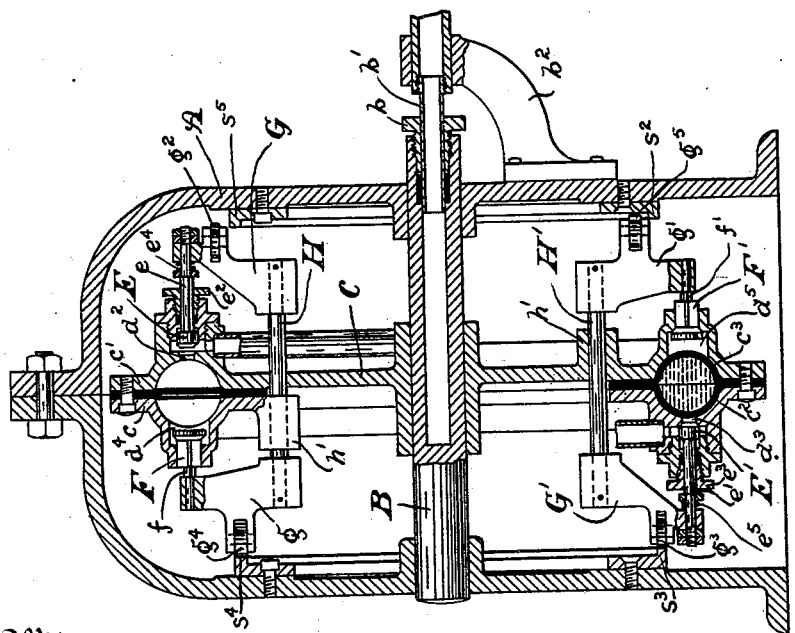

In the drawings, Figure 1 is a sectional elevation, and Fig. 2 a front elevation, of the structure embodying my invention. Fig. 3 is an enlarged front elevation of the hollow rim, one-half of which is removed to show the position of and method of fastening one of the flexible diaphragms. Fig. 4 is a partial end view of the rim, showing in broken lines the relative positions of two adjoining ends of the two diaphragms and of the clips for fastening them. Fig. 5 is a front elevation of the half rings or tracks provided to operate the valves, the detached portions at each side showing the relative positions of the inclines provided to contact the rollers.

Referring to the drawings, I provide a main outer casing A, of inverted-U-shaped section, and consisting of two parts suitably bolted together. This casing is supplied with bearings $a\ a$, in which revolves the shaft B, made hollow a certain portion of its length. Firmly fastened to the shaft in any suitable manner is the wheel C, having a hollow tubular rim of circular section, preferably constructed by bolting two half-circular sections $c$ and $c'$ together, the section $c'$ forming an integral part of the wheel, and suitable packing being provided to make the joint perfectly tight.

Within this hollow rim are two diaphragms $c^2$ and $c^3$, made of flexible material, each occupying slightly over one-half the circumference of the channel, so that the ends of each extend by the other slightly and each of which, in conjunction with one of the walls of the channel to which it is tightly fastened, forms a pocket or chamber. In Fig. 3 is shown the clips $d$ and $d'$ for fastening these diaphragms at their ends, and in Fig. 4 the position of the clips $d$ and $d'$ of two adjoining ends with reference to each other. The hollow tubular rim is about half-filled with mercury, which takes nearly the lowest position, as shown by the broken lines in Fig. 2 and as will be explained hereinafter, and which by its weight presses that part of the diaphragm in contact with it to the wall of the channel.

Each pocket is provided at one end with an inlet or admission port $d^2$ and $d^3$, governed, respectively, by valves E and E', and at the other end of each pocket is an exhaust-port $d^4$ and $d^5$, governed, respectively, by valves F and F'. These ports are so arranged that the admission-port of one pocket is diametrically opposite the exhaust-port of that pocket, while the admission-port of one pocket and exhaust-port of the other pocket are in line with each other. This will be readily seen by reference to Fig. 1. The valves E and E' are provided with suitable stems $e$ and $e'$, working through stuffing-boxes $e^2$ and $e^3$, and adjustably connected to these stems are the arms G and G'. The valves F and F' are also provided with stems $f$ and $f'$, and fitting loosely to these stems and working against shoulders on them are the arms $g$ and $g'$. These arms are adapted to only open the exhaust-valves, while to close them the suction of the escaping air is relied upon. If this should not in all cases be sufficient, it is evident that the stems $f$ and $f'$ could be made longer and each supplied with a collar adapted to hold a coiled spring against its corresponding arm. To connect each set of arms G and $g$ and G' and $g'$ so that each set of valves shall operate in unison, I provide shafts H and H', guided and supported by suitable bosses $h$ and $h'$. The arms G and G' are provided with rollers $g^2$ and $g^3$, and the arms $g$ and $g'$ with rollers $g^4$ and $g^5$. To operate each roller and its arm and connected valves, I provide a raised track suitably fastened to the casing, one track for each roller, and marked $s^2$, $s^3$, $s^4$, and $s^5$, and actuating, respectively, the rollers $g^2$ and $g^3$, $g^4$ and $g^5$. Each track extends over about one-half the circumference of the path described by its corresponding roller and acts to hold the valve or valves its roller operates open or closed, as the case may be, during that part of a revolution. In Fig. 5 is shown a view of the tracks $s^3$ and $s^4$ with the method of adjusting them, so as to open and close the valves at the proper moments. It will be evident that the tracks $s^4$ and $s^5$ operate to open the valves and the tracks $s^2$ and $s^3$ to close them, and that while the opening movement given the valves is positive, that in closing, the springs $e^4$ and $e^5$ on the stems of the admission-valves furnish a yielding medium to prevent the valves from being pressed so hard upon their seats as to cause the rollers $g^2$ and $g^3$ to bind upon their tracks, a case which might happen with careless workmanship in fitting up the structure.

Each of the valves E and E' operates in a chamber connected by pipes $s$ and $s'$ to the hollow shaft B. In one end of this shaft is provided a stuffing-box $b$, and a hollow pipe $b'$, turned to fit the hollow shaft B, is connected to the source of air supply. To support this connection, I provide a bracket $b^2$, and the connecting-pipe is supplied with a suitable means of regulating the supply.

It is evident from the foregoing description that when compressed air is admitted through the main supply-pipe, the upper admission-valve being always open and the diaphragm of the pocket whose admission-port that valve governs being out of contact with the mercury, air rushes in and inflates the diaphragm and fills the pocket to the point where it is just emerging from the body of mercury and presses against the body of mercury, through the medium of the diaphragm, and at the same time presses in the other direction against the other end of the pocket, and as the weight of the body of mercury tends to balance this pressure in one direction the pressure in the other direction, being practically unbalanced, causes the wheel to revolve. When it has reached the point where the advancing end of this diaphragm is about to enter the mercury again, the roller governing the closing of the admission-valve to this pocket runs up the incline on its track and closes the valve, and at the same time the roller which opens the exhaust-valve of this pocket and which also opens the admission-valve of the other pocket runs up the incline on its track and opens its valve, allowing the air to exhaust from the pocket first mentioned and to enter the second pocket, and so on, these operations taking place in turn and causing the wheel to revolve with great rapidity.

It is evident that the exhaust-valves F and F' might be dispensed with, since, as that end of the pocket is the last to emerge from the mercury, the latter holds the diaphragm pressed tightly over the openings $d^4$ and $d^5$, thus preventing any escape of the air confined in the pocket until the edge of the opening is above the level of the mercury, when the confined air would press the diaphragm away from the opening and escape. For some purposes this exhaust would take place too soon, and therefore I have preferred to show the structure with puppet exhaust-valves; but I do not desire to be confined to that structure. It is also evident that when the air is first allowed to enter its pressure against the body of the mercury will cause the latter to rise a little higher in one side of the hollow rim than in the other; but as the wheel revolves its friction with the mercury will partly counteract this tendency until the mercury is more nearly of the same level in each side of the rim. Hence the object of making the tracks adjustable that they may be set to actuate the valves at the proper time for obtaining the best results.

While I have described my invention with more or less completeness as regards the details thereof and as being embodied in more or less precise form, I do not desire to be limited thereto unduly, as I contemplate all proper changes of form, omission of parts, and the substitution of equivalents as circumstances may suggest or necessity render expedient.

I claim—

1. In an air-motor, the combination of a wheel provided with a hollow rim, a body of mercury within such rim, a flexible diaphragm within such hollow rim forming a compartment separate from that occupied by said body of mercury, said compartment provided with ports for the admission and exhaust of compressed air, substantially as described.

2. In an air-motor, the combination of a wheel provided with a hollow rim, a body of mercury within such rim, a flexible diaphragm adapted to form a compartment in such hollow rim separate from that occupied by said body of mercury, said compartment provided with ports for the admission and exhaust of compressed air, said exhaust-port adapted to be closed during the passage of said diaphragm through said body of mercury, substantially as described.

3. In an air-motor, the combination of a wheel provided with a hollow rim, a body of mercury within such hollow rim, flexible diaphragms within such hollow rim adapted to form compartments separate from that occupied by said body of mercury, each of said compartments provided near one end with a port for the admission of compressed air, and near the other end with a port adapted to exhaust said compressed air, and valves adapted to govern said ports, substantially as described.

4. In an air-motor, the combination of a wheel provided with a hollow rim, a body of mercury within such hollow rim, flexible diaphragms within such hollow rim adapted to form compartments separate from that occupied by said body of mercury, each of said compartments provided near one end with a port for the admission of compressed air, and near the other end with a port adapted to exhaust said compressed air, and valves adapted to govern said ports, and to be actuated as the wheel revolves, by mechanism suitable to operate such valves to open and close said ports successively, substantially as described.

5. In an air-motor, the combination of a wheel provided with a hollow rim, a body of mercury within such rim, and means whereby compressed air is twice admitted to said hollow rim during one revolution of said wheel, substantially as described.

6. In an air-motor, the combination of a wheel provided with a hollow rim, and means whereby compressed air is twice admitted to and exhausted from such hollow rim during one revolution of said wheel, substantially as described.

7. In an air-motor, the combination of a wheel provided with a hollow rim, a body of mercury within such hollow rim, flexible diaphragms within such hollow rim adapted to form compartments separate from that occupied by said body of mercury, each of said compartments provided near one end with a port for the admission of compressed air, and near the other end with a port adapted to exhaust said compressed air, and valves adapted to govern said ports, such valves so arranged that the valve governing one admission-port is diametrically opposite the valve governing the other admission-port, substantially as described.

8. In an air-motor, the combination of a wheel provided with a hollow rim, a body of mercury within such hollow rim, flexible diaphragms within such rim and adapted to form two compartments each separate from that occupied by said mercury, and each provided near one end with a port for the admission of compressed air, and near the other end with a port through which the compressed air is exhausted, and so arranged that the admission-port of one compartment is in line with the exhaust-port of the other compartment, and that the admission and exhaust ports of the same compartment are situated at points on the rim diametrically opposite each other, valves adapted to govern said ports, the admission-valve of each compartment and exhaust-valve of the other connected by mechanism suitable to open both at the same time and a cam adapted to operate such mechanism, substantially as described.

9. In an air-motor, the combination of a wheel provided with a hollow rim, a body of mercury within such hollow rim, flexible diaphragms within such rim and adapted to form two compartments each separate from that occupied by said mercury and each provided near one end with a port for the admission of compressed air, and near the other end with a port through which the compressed air is exhausted, and so arranged that the admission-port of one compartment is in line with the exhaust-port of the other compartment, and that the admission and the exhaust ports of the same compartment are situated at points on the rim diametrically opposite each other, valves adapted to govern said ports, the admission-valve of each compartment and the exhaust-valve of the other compartment provided with suitable stems, each of said stems provided with an arm, and a shaft adapted to connect each pair of said arms and provided with a suitable guide, each of said arms having a suitable roller, and a track or cam adapted to contact and operate each of such rollers, substantially as described.

10. In an air-motor, the combination of a wheel provided with a hollow rim, a body of mercury within such hollow rim, flexible diaphragms within such rim and adapted to form two compartments each separate from that occupied by said mercury and each provided near one end with a port for the admission of compressed air, and near the other end with a port through which the compressed air is exhausted, and so arranged that the admission-port of one compartment is in line with the exhaust-port of the other compartment, and that the admission and exhaust ports of the same compartment are situated at points on the rim diametrically opposite each other, valves adapted to govern said ports, the admission-valve of each compartment and the exhaust-valve of the other compartment provided with suitable stems, each of said stems provided with an arm, and a shaft adapted to connect each pair of said arms and provided with a suitable guide, each of said arms having a suitable roller and a track or cam adapted to contact and operate each of such rollers, a shaft, hollow a certain portion of its length and adapted to carry and be operated by such wheel, and such hollow portion of said shaft connected with a source of compressed air, and with each of said admission-ports, a casing adapted to carry said shaft and having said tracks or cams suitably fastened to it, substantially as described.

11. In an air-motor, the combination of a wheel provided with a hollow rim, a body of mercury within such hollow rim, flexible diaphragms within such rim and adapted to form two compartments each separate from that occupied by said mercury and each provided near one end with a port for the admission of compressed air, and near the other end with a port through which the compressed air is exhausted, and so arranged that the admission-port of one compartment is in line with the exhaust-port of the other compartment, and that the admission and exhaust ports of the same compartment are situated at points on the rim diametrically opposite each other, valves adapted to govern said ports, the admission-valve of each compartment and exhaust-valve of the other connected by mechanism suitable to open both at the same time and a cam adapted to operate such mechanism, and a cam adapted to close said admission-valves, substantially as described.

12. In an air-motor, the combination of a wheel provided with a hollow rim, a body of mercury within such hollow rim, flexible diaphragms within such hollow rim adapted to form compartments separate from that occupied by said body of mercury, each of said compartments provided near one end with a port for the admission of compressed air, and near the other end with a port adapted to exhaust said compressed air, and valves adapted to govern said ports, such valves so arranged that the admission-valve of one compartment is in line with the exhaust-valve of the other compartment and means whereby each pair of valves is opened by the same cam, substantially as described.

CHESTER J. UNDERWOOD.

Witnesses:
HENRY F. NOYES,
R. D. HOLLEMBEAK.